US010797559B2

(12) United States Patent
Thawani et al.

(10) Patent No.: US 10,797,559 B2
(45) Date of Patent: Oct. 6, 2020

(54) ISOLATORS FOR MOTORS

(71) Applicants: DENSO International America, Inc., Southfield, MI (US); DENSO CORPORATION, Kariya, Aichi-pref. (JP)

(72) Inventors: Prakash Thawani, Bloomfield Hills, MI (US); Stephen Sinadinos, Commerce Township, MI (US); Shawn Westergaard, Sterling Heights, MI (US)

(73) Assignees: DENSO International America, Inc., Southfield, MI (US); DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 16/124,823

(22) Filed: Sep. 7, 2018

(65) Prior Publication Data
US 2020/0080617 A1 Mar. 12, 2020

(51) Int. Cl.
*H02K 5/24* (2006.01)
*H02K 5/00* (2006.01)
*F16F 15/129* (2006.01)
*F04C 15/00* (2006.01)
*F16C 37/00* (2006.01)

(52) U.S. Cl.
CPC .......... *H02K 5/24* (2013.01); *F04C 15/0065* (2013.01); *F16C 37/002* (2013.01); *F16F 15/1295* (2013.01); *H02K 5/00* (2013.01); *F04C 2270/12* (2013.01)

(58) Field of Classification Search
USPC ................................. 310/51, 89, 91; 248/638
See application file for complete search history.

(56) References Cited

U.S. PATENT DOCUMENTS

| 2,915,265 A | * | 12/1959 | Tiger | G11B 15/26 248/575 |
| 4,816,710 A | | 3/1989 | Silvaggio et al. | |
| 5,339,745 A | * | 8/1994 | Ritzl | B60G 99/00 105/452 |
| 5,876,014 A | | 3/1999 | Noritake et al. | |
| 6,011,336 A | * | 1/2000 | Mathis | F16F 1/376 248/628 |
| 6,069,466 A | | 5/2000 | Noritake et al. | |
| 6,279,866 B1 | * | 8/2001 | Eilemann | F04D 29/668 248/603 |
| 6,416,030 B1 | | 7/2002 | Bergdahl et al. | |
| 7,303,595 B1 | | 12/2007 | Janitz | |

(Continued)

FOREIGN PATENT DOCUMENTS

GB 953057 * 3/1964
JP S4123866 Y1 12/1966

(Continued)

*Primary Examiner* — Quyen P Leung
*Assistant Examiner* — Alexander A Singh
(74) *Attorney, Agent, or Firm* — Harness, Dickey & Pierce, P.L.C.

(57) ABSTRACT

A motor for driving a fan in a heating and/or cooling system includes a motor body, a motor cover, and an isolator. The isolator damps vibrations passed from the motor body to the motor cover. The isolator includes two isolating elements connected by a bridge. At least one of the two isolating elements includes at least two corners in a cross-sectional view.

20 Claims, 4 Drawing Sheets

(56) References Cited

U.S. PATENT DOCUMENTS

| | | |
|---|---|---|
| 7,364,261 B2 | 4/2008 | Herwald et al. |
| 7,566,998 B2 | 7/2009 | Winkler et al. |
| 7,634,926 B2 | 12/2009 | Park et al. |
| 7,679,233 B2 | 3/2010 | Winkler et al. |
| 7,789,194 B2 | 9/2010 | Lathrop et al. |
| 9,435,339 B2 | 9/2016 | Calhoun et al. |
| 2006/0125330 A1* | 6/2006 | Winkler .................. H02K 5/24 310/51 |
| 2009/0152963 A1 | 6/2009 | Winkler et al. |
| 2009/0243172 A1 | 10/2009 | Ting et al. |
| 2009/0258591 A1 | 10/2009 | Carter |
| 2011/0101800 A1* | 5/2011 | Schiel ................. F04D 25/0606 310/51 |
| 2011/0120740 A1 | 5/2011 | Moreno et al. |
| 2017/0023021 A1 | 1/2017 | Ogata et al. |

FOREIGN PATENT DOCUMENTS

| | | |
|---|---|---|
| JP | H0175642 U | 5/1989 |
| JP | 2006527577 A | 11/2006 |
| JP | 2017067154 A | 4/2017 |

\* cited by examiner

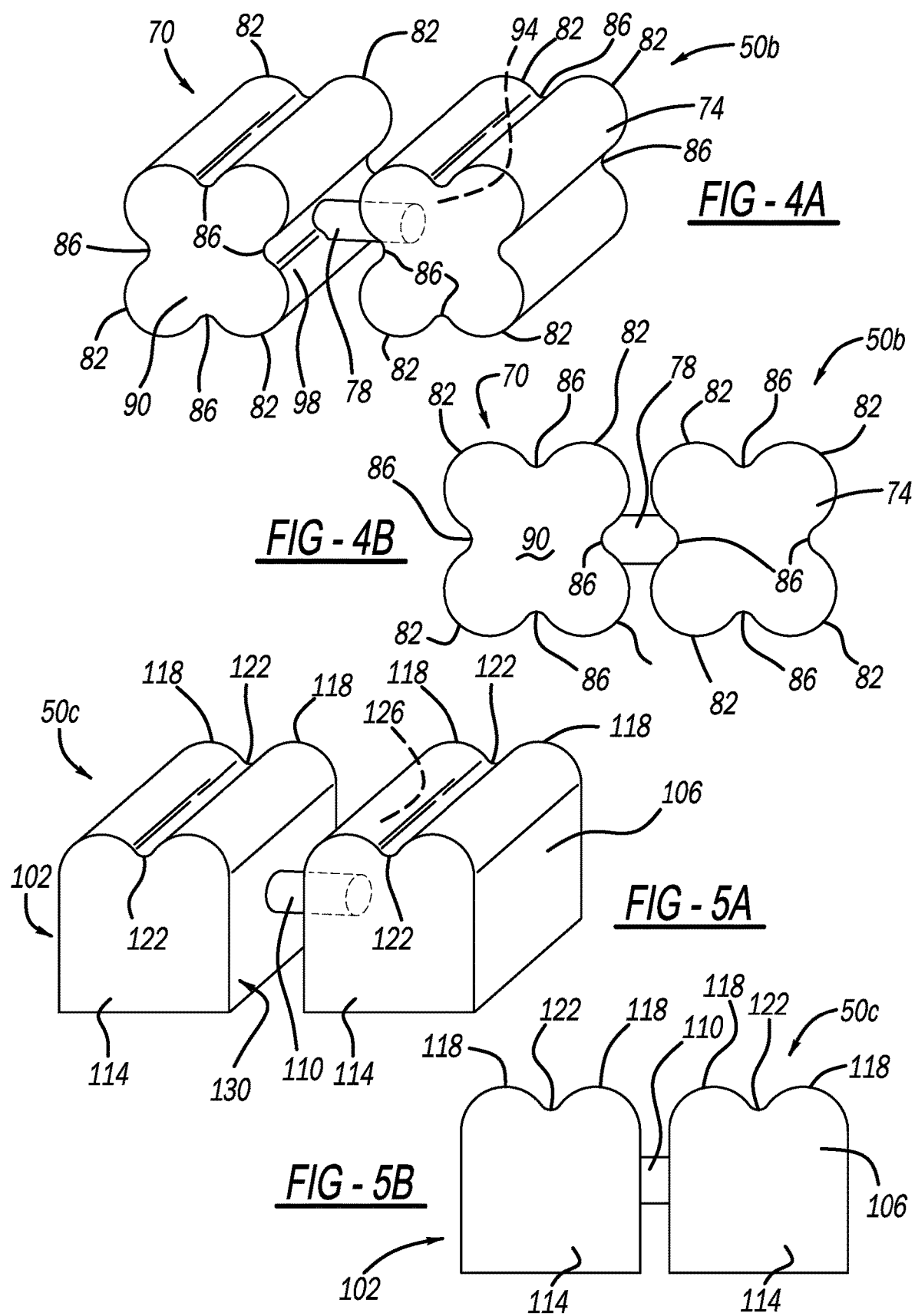

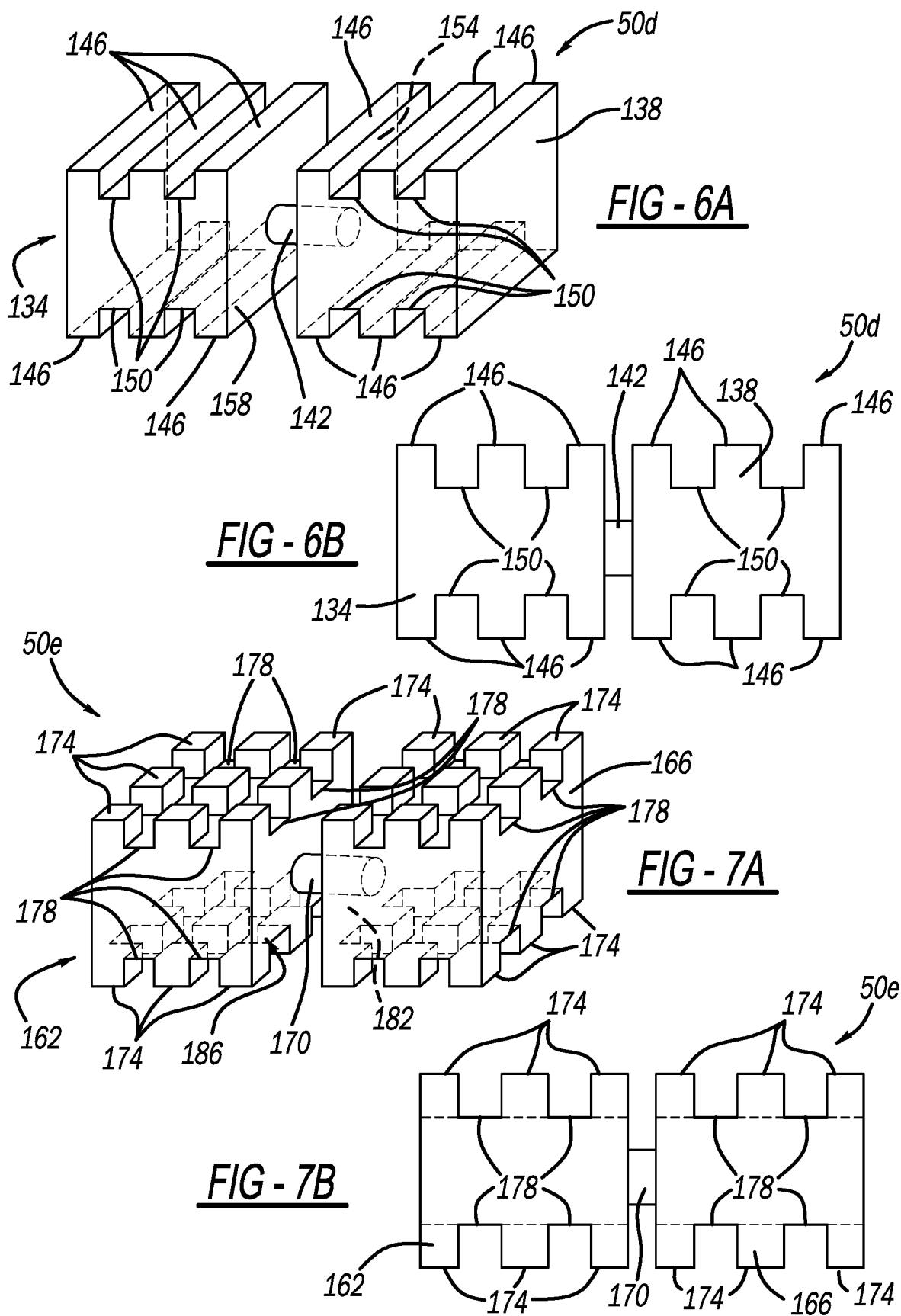

ISOLATORS FOR MOTORS

FIELD

The present disclosure relates to isolators for motors, and, in particular, to improved decoupling isolators for motors.

BACKGROUND

This section provides background information related to the present disclosure which is not necessarily prior art.

Electric motors are often used in fans in heating and/or air conditioning systems in motor vehicles or residential living quarters. It is ideal for the electric motors to be isolated from vibrations to avoid or reduce the transmission of structure-borne noise from the motor or the fan unit to the body and thus to the passenger compartment of the vehicle. For example, when a fan wheel is out of balance, noise and vibrations from the electric motor are transmitted to the housing and, eventually, the vehicle compartment or any occupied space.

Sometimes, elastic elements are inserted between the motor and the motor housing or in a connection flange of the motor housing to damp the vibrations of the air conditioner or the body and to suppress noises in the passenger compartment of the vehicle.

SUMMARY

This section provides a general summary of the disclosure, and is not a comprehensive disclosure of its full scope or all of its features.

An example motor for driving a fan in a heating and/or cooling system according to the present disclosure includes a motor body, a motor cover, and an isolator. The isolator damps vibrations passed from the motor body to the motor cover. The isolator includes two isolating elements connected by a bridge. At least one of the two isolating elements includes at least two corners in a cross-sectional view.

At least one of the two isolating elements may be a cube, a cuboid, or a rectangular prism, having eight corners and six faces.

At least one of the two isolating elements may be an X-shaped prism or cross-shaped prism.

At least one of the two isolating elements may be a cube, a cuboid, or a rectangular prism on a lower half and a prism having rounded corners and a rounded recess separating the rounded corners on an upper half.

At least one of the two isolating elements may be a cube, a cuboid, or a rectangular prism having a plurality of rectangular projections along a top side and a plurality of rectangular recesses separating the plurality of rectangular projections.

At least one of the two isolating elements may include three rectangular projections along the top side.

At least one of the two isolating elements may be a cube, a cuboid, or a rectangular prism having a plurality of cube, cuboid, or rectangular prism projections along a top side and a plurality of rectangular recesses separating the plurality of projections.

At least one of the two isolating elements may include nine cube, cuboid, or rectangular prism projections along the top side.

The two isolating elements may be the same.

The bridge may connect opposing inside faces of the two isolating elements and may have a square, a rectangle, a circular, or an elliptical cross-section.

The motor may further include a flange extending radially from the motor body. The motor cover may connect to the flange and cooperate with the flange to support the motor body. The isolator may be arranged horizontally between an outer surface of the motor body and an inner surface of the motor cover or an inner surface of the flange on opposing sides.

The motor may further include at least one bracket having a leg extending orthogonal to the motor body. The at least one bracket may include a slot, where the bridge is clamped within the slot and supported by the at least one bracket.

An example isolator configured to damp vibrations in a motor of a heating and/or cooling system according to the present disclosure includes two isolating elements and a bridge connecting opposing inner faces of the two isolating elements. At least one of the two isolating elements includes at least two corners in a cross-sectional view.

At least one of the two isolating elements may be a cube, a cuboid, or a rectangular prism, having eight corners and six faces.

At least one of the two isolating elements may be an X-shaped prism or cross-shaped prism.

At least one of the two isolating elements may be a cube, a cuboid, or a rectangular prism on a lower half and a prism having rounded corners and a rounded recess separating the rounded corners on an upper half.

At least one of the two isolating elements may be a cube, a cuboid, or a rectangular prism having at least three rectangular projections along a top side and at least two rectangular recesses, with one rectangular recess separating two of the at least three rectangular projections.

At least one of the two isolating elements may be a cube, a cuboid, or a rectangular prism having a plurality of cube, cuboid, or rectangular prism projections along a top side and a plurality of rectangular recesses separating the plurality of projections.

The two isolating elements may be the same.

The bridge may connect opposing inside faces of the two isolating elements and may have a square, a rectangle, a circular, or an elliptical cross-section.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 4A is a cross-sectional view of another isolator according to the present disclosure.

FIG. 4B is a side view of the isolator of FIG. 4A.

FIG. 5A is a cross-sectional view of another isolator according to the present disclosure.

FIG. 5B is a side view of the isolator of FIG. 5A.

FIG. 6A is a cross-sectional view of another isolator according to the present disclosure.

FIG. 6B is a side view of the isolator of FIG. 6A.

FIG. 7A is a cross-sectional view of another isolator according to the present disclosure.

FIG. 7B is a side view of the isolator of FIG. 7A.

Corresponding reference numerals indicate corresponding parts throughout the several views of the drawings.

DETAILED DESCRIPTION

Example embodiments will now be described more fully with reference to the accompanying drawings.

Figure 1A:
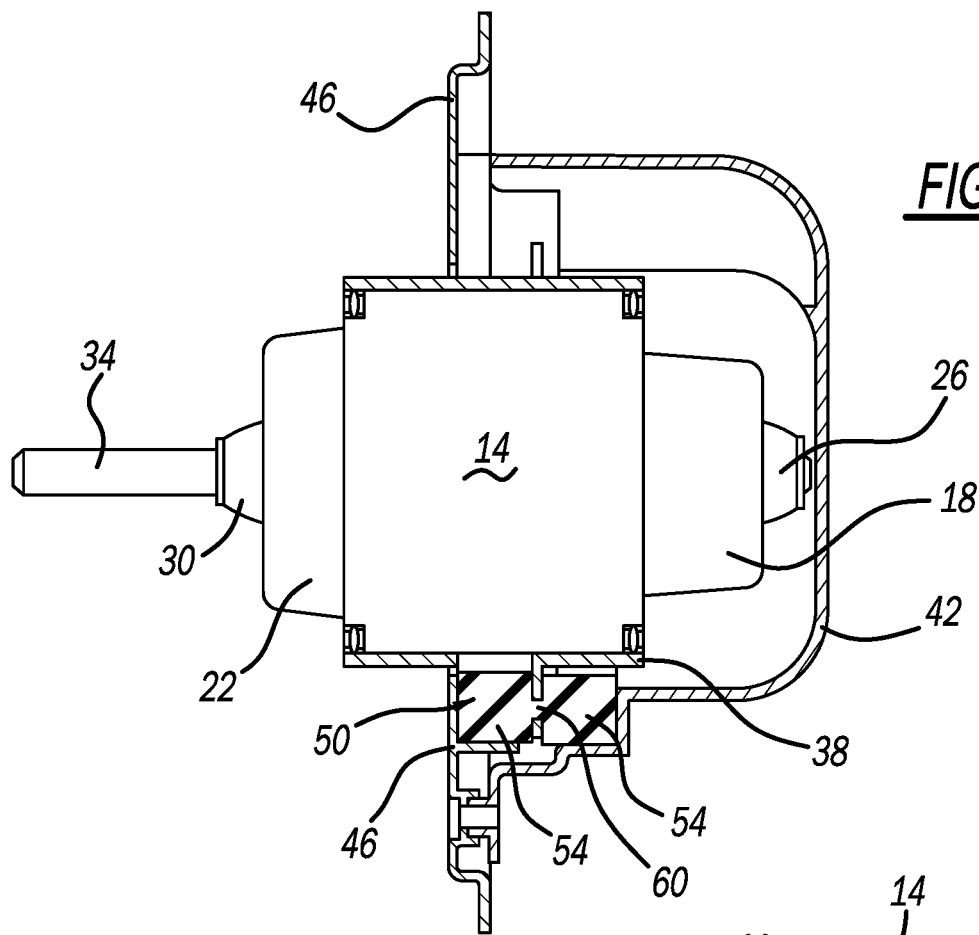
FIG. 1A is a section view of an electric motor disposed in a motor cover according to the present disclosure.
Figure 1B:
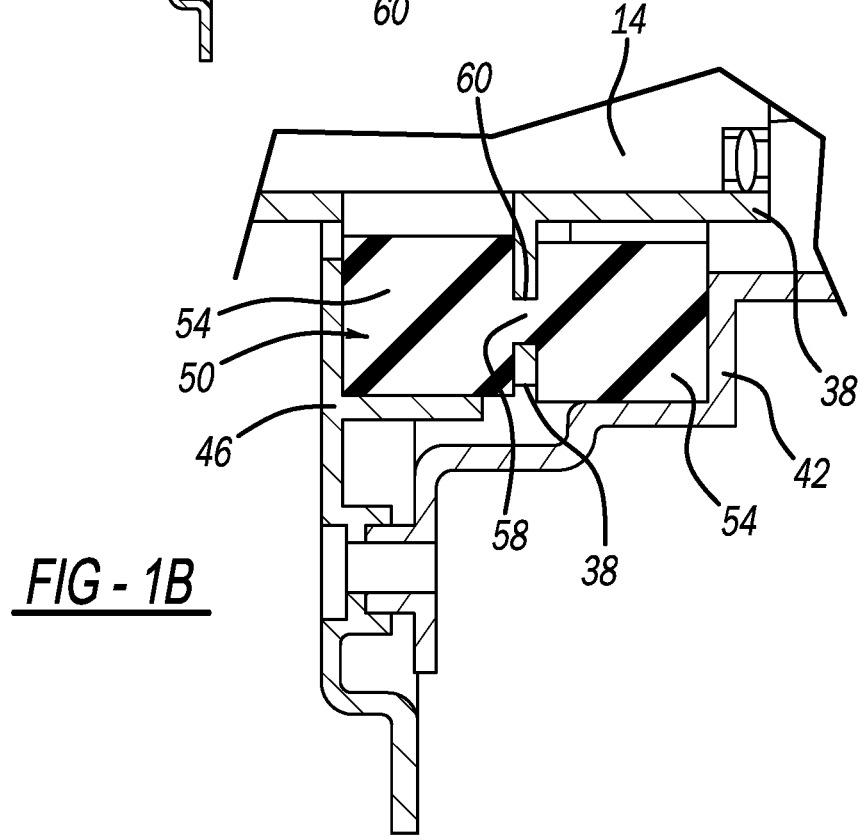
FIG. 1B is a detailed view of a connection between the motor and the motor cover of FIG. 1A.

With reference to FIGS. 1A and 1B, a motor, such as a motor driving a fan, 10 for a heating and/or cooling system (HVAC system) is illustrated. The heating and/or cooling system may be suitable for heating and/or cooling any suitable device, such as an interior compartment of a vehicle. The heating and/or cooling system may be installed in a vehicle, or the heating and/or cooling system is suitable for heating and/or cooling any suitable non-vehicular compartment as well. With respect to vehicles, the vehicle may be a passenger vehicle or any other suitable vehicle, such as any recreational vehicle, mass transit vehicle, military vehicle, construction vehicle/equipment, watercraft, aircraft, etc.

The motor 10 includes a motor body or motor housing 14. The motor body 14 is a cylindrical housing of at least one layer (for example, a double layer cylindrical housing) and may be formed of a steel, or any other suitable material.

The motor body 14 includes a plurality of magnets (not shown) attached on an inner circumferential surface. The plurality of magnets (not shown) serve as a stator for the motor 10. A first end shield 18 and a second end shield 22 are fastened to the motor body 14 on opposing sides of the motor body 14.

The first end shield 18 and the second end shield 22 each include a bearing 26, 30 which supports a shaft 34 extending therethrough. The shaft 34 connects to a rotor (not shown) disposed within the motor 10 and is rotationally driven by the motor 10.

At least one bracket 38 is disposed on an exterior of the motor body 14. The at least one bracket 38 may be an L-shaped bracket having a first leg fixed to the motor body 14 and a second leg projecting orthogonally to the motor body 14. In some embodiments, three brackets 38 may be uniformly distributed over an outer circumference of the motor body 14 and arranged in a plane perpendicular to the axis of the motor body. While three brackets are depicted, it is understood that any number of brackets may be used.

A flange 46 may also be disposed on the exterior of the motor body 14 for supporting the motor body 14 within the motor cover 42. The flange 46 may be an annular flange extending around the outer circumference of the motor cover 42. The flange 46 may include at least one bend defining a connection for the motor cover 42 and may cooperate with the motor cover 42 to support the motor body 14. The flange 46 closes the motor cover 42 and additionally fastens the overall system on the body of a motor vehicle, for example.

At least one isolator 50 acts as a damping element for the motor 10. The isolator 50 is attached to the bracket 38 that projects radially from the motor body 14. A curved receptacle for the isolator 50 may be formed in the flange 46 or the motor cover 42 to house the isolator 50.

The isolator 50 may have a dumbbell-like shape with two isolating elements 54 permanently connected by a bridge 58.

The isolator 50 is arranged horizontally between the outer surface of the motor body 14 and the inner surface of the motor cover 42 or the inner surface of the flange 46 on opposing sides. When installed, the bridge 58 between the two isolating elements 54 is inserted in a slot 60 of the bracket 38 and clamped therein. The isolating elements 54 may be comprised of an elastic material, such as, for example, rubber, or another elastomer.

Figure 2A:
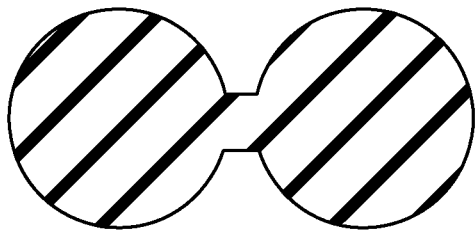
FIG. 2A is a cross-sectional view of a prior art spherical isolator.
Figure 2B:
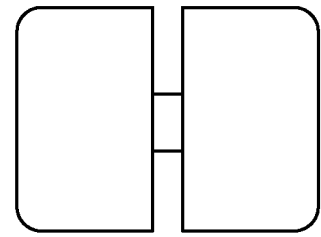
FIG. 2B is a side view of a prior art cylindrical isolator.

At least one of the two isolating elements 54 on each isolator 50 may have at least two corners in a cross-sectional view (see FIGS. 3A-8B). For example, in some embodiments, at least one of the two isolating elements 54 may have a square or rectangular shape in the cross-sectional view. This is counter to FIGS. 2A and 2B which illustrate prior art, spherical (FIG. 2A) or cylindrical (FIG. 2B), configurations. The spherical/cylindrical isolators as shown in FIGS. 2A and 2B are designed to roll as torque is generated by the motor 10, resulting in wobbling and leading to $3^{rd}$ order harmonic vibration (for example, at frequency F=RPMX3/60 Hertz Hz, or approximately 200 Hz) in the vehicle compartment. Additionally, at higher temperatures, the spherical/rolled isolators become more elastic, resulting in excessive displacement of the blower rim and rubbing between the far end of the mounted blower wheel and the blower scroll inlet. The wheel rubbing generates audible sound leading to durability and customer complaints.

Having the, at least partially, squared/cubical or rectangular configuration, as shown in FIGS. 1A, 1B, and 3A-8B is advantageous over the prior art spherical/cylindrical configuration. The configurations of FIGS. 1A, 1B, and 3A-3B do not roll as torque is generated by the motor 10. As such, the presently described configurations eliminate or drastically reduce wobbling, excessive noise, and wheel rubbing as found with the spherical and cylindrical isolators.

In use, the release of torque by the electric motor 10 results in a compression and deformation of the isolating elements 54. As the isolating elements are compressed elastically, they generate a restoring force as a result of the elastic deformation. In this way, it is possible to damp the vibrations of the electric motor 10 so that these vibrations are not transmitted on to the motor cover 42 or the flange 46. In doing so, the necessity for an additional, vibrationally isolating mounting to accommodate the motor 10 is eliminated.

By using the isolating elements 54 in combination with the flange 46 or the motor cover 42, it is possible to influence the elastic properties of the isolating elements 54 in the mounting in a targeted manner in order to thereby achieve, if necessary, a different damping behavior in the radial, axial or tangential direction.

Figure 3A:
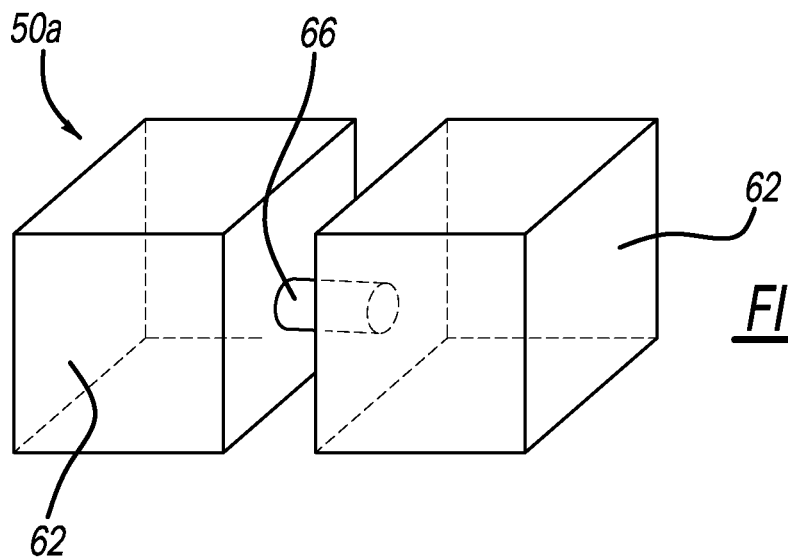
FIG. 3A is a cross-sectional view of an isolator according to the present disclosure.
Figure 3B:
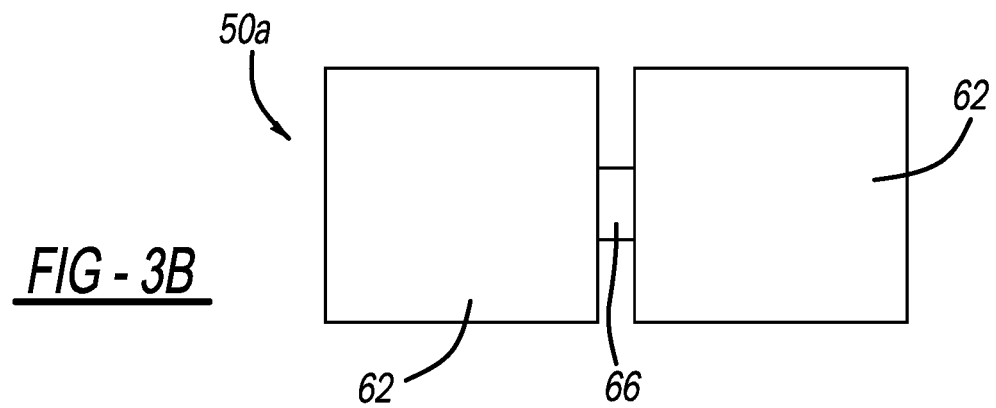
FIG. 3B is a side view of the isolator of FIG. 3A.

Now referring to FIGS. 3A and 3B, an example isolator 50a is illustrated. The isolator 50a may have a dumbbell-like shape with two isolating elements 62 permanently connected by a bridge 66. The two isolating elements 62 may be similar to the two isolating elements 54 and the bridge 66 may be similar to the bridge 58. Each of the two isolating elements 62 may be a cube, a cuboid, or a rectangular prism, having 8 corners and 6 faces. In some embodiments, the isolating elements 62 may have a square or rectangular cross-sectional shape.

The bridge 66 may be a rectangular parallelepiped, a rectangular prism, cuboid, cylindrical rod, or other-shaped bridge that permanently connects inner faces of the isolating elements 62. In some embodiments, the bridge 66 may include a square, a rectangle, a circular, or an elliptical cross-section. In other embodiments, the bridge 66 may have any type of cross-sectional shape, to include, for example only, triangular, pentagon, hexagon, heptagon, octagon, etc.

The two isolating elements 62 and bridge 66 may be formed of the same material and may be a single, monolithic, element or piece. For example, the isolating elements 62 and bridge 66 may be formed of an elastic material, such as a rubber or another elastomer. The isolator 50a may be formed from a single piece of elastic material. For example, the isolator 50a may be injection molded, compression molded, transfer molded, cut from a solid piece of material, extruded, solid-state forming, solution processing, dispersion processing, or formed using any other process for elastomers.

In use, the release of torque by the electric motor 10 results in a compression and deformation of the isolating elements 62. Instead of a point or line contact as in the examples of FIGS. 2A and 2B, the isolating elements 62 provide an improved surface contact, resulting in reduction or elimination of wobbling. In this way, it is possible to damp the vibrations of the electric motor 10 to reduce noise and vibrations in the vehicle compartment.

Now referring to FIGS. 4A and 4B, an example isolator 50b is illustrated. The isolator 50b may have a dumbbell-like shape with two isolating elements 70, 74 permanently connected by a bridge 78. The two isolating elements 70, 74 may be the same or identical to each other. The isolating elements 70, 74 may be X-shaped, or cross-shaped, prisms, having rounded corners 82, rounded recesses 86 separating the corners 82, and two flat faces 90. In some embodiments, the isolating elements 70, 74 may have an X-shape or cross cross-sectional shape that is constant throughout. Instead of a point or line contact as in the examples of FIGS. 2A and 2B, the isolating elements 70, 74 provide an improved surface contact, resulting in reduction or elimination of wobbling. Thus, these examples avoid wobbling and thereby suppress excitation of the third ($3^{rd}$) order.

While the isolating elements 70, 74 are described and illustrated as being identical, the isolating elements 70, 74 may be different from one another, but may be similar to other isolating elements described herein. For example, one of the isolating elements 70, 74 may be similar to isolating elements 54 and 62. The differing isolating element may be a cube, a cuboid, or a rectangular prism, having 8 corners and 6 faces. In some embodiments, the differing isolating element may have a square or rectangular cross-sectional shape.

The bridge 78 may be similar to the bridges 58 and 66. The bridge 78 may be a rectangular parallelepiped, a rectangular prism, cuboid, cylindrical rod, or other-shaped bridge that permanently connects the isolating elements 70, 74. In some embodiments, the bridge 78 may include a square, a rectangle, a circular, or an elliptical cross-section. In other embodiments, the bridge 78 may have any type of cross-sectional shape, to include, for example only, triangular, pentagon, hexagon, heptagon, octagon, etc.

The bridge 78 may connect to a center of the rounded recess 86 on an inner side 98 of each of the isolating elements 70, 74. The isolating elements 70, 74 and bridge 78 may be formed of the same material and may be a single, monolithic, element or piece. For example, the isolating elements 70, 74 and bridge 78 may be formed of an elastic material, such as a rubber or another elastomer. The isolator 50b may be formed from a single piece of elastic material. For example, the isolator 50b may be injection molded, compression molded, transfer molded, cut from a solid piece of material, extruded, solid-state forming, solution processing, dispersion processing, or formed using any other process for elastomers.

In use, the release of torque by the electric motor 10 results in a compression and deformation of the isolating elements 70, 74. Since the isolating elements 70, 74 provide an improved surface contact over the point or line contact of FIGS. 2A and 2B, the isolating elements 70, 74 provide a reduction or elimination of wobbling. In this way, it is possible to damp the vibrations of the electric motor 10 to reduce noise and vibrations in the vehicle compartment.

Now referring to FIGS. 5A and 5B, an example isolator 50c is illustrated. The isolator 50c may have a dumbbell-like shape with two isolating elements 102, 106 permanently connected by a bridge 110. The two isolating elements 102, 106 may be a cube, a cuboid, or a rectangular prism 114 on a lower half and a prism having rounded corners 118 and a rounded recess 122 separating the corners 118 on an upper half. The recess 122 in isolating elements 102, 106 may provide for side energy dissipation. In some embodiments, the isolating elements 102, 106 may have a cross-sectional shape that is constant throughout.

While the isolating elements 102, 106 are described and illustrated as being the same, the isolating elements 102, 106 may be different from each other, but may be similar to other isolating elements described herein. For example, one of the isolating elements 102, 106 may be similar to isolating elements 54, 62, and 74. The differing isolating element may be a cube, a cuboid, or a rectangular prism, having 8 corners and 6 faces. In some embodiments, the differing isolating element may have a square or rectangular cross-sectional shape.

The bridge 110 may be similar to the bridges 58, 66, and 78. The bridge 110 may be a rectangular parallelepiped, a rectangular prism, cuboid, cylindrical rod, or other-shaped bridge that permanently connects the isolating elements 102, 106. In some embodiments, the bridge 110 may include a square, a rectangle, a circular, or an elliptical cross-section. In other embodiments, the bridge 110 may have any type of cross-sectional shape, to include, for example only, triangular, pentagon, hexagon, heptagon, octagon, etc. The bridge 110 may connect to a center of an inner face 126 of the isolating element 106 and to an inner face 130 of the isolating element 102.

The isolating elements 102, 106 and bridge 110 may be formed of the same material and may be a single, monolithic, element or piece. For example, the isolating elements 102, 106 and bridge 110 may be formed of an elastic material, such as a rubber or another elastomer. The isolator 50c may be formed from a single piece of elastic material. For example, the isolator 50c may be injection molded, compression molded, transfer molded, cut from a solid piece of material, extruded, solid-state forming, solution processing, dispersion processing, or formed using any other process for elastomers.

In use, the release of torque by the electric motor 10 results in a compression and deformation of the isolating elements 102, 106. Instead of a point or line contact as in the examples of FIGS. 2A and 2B, the isolating elements 102, 106 provide an improved surface contact, resulting in reduction or elimination of wobbling. In this way, it is possible to damp the vibrations of the electric motor 10 to reduce noise and vibrations in the vehicle compartment.

Now referring to FIGS. 6A and 6B, an example isolator 50d is illustrated. The isolator 50d may have a dumbbell-like shape with two isolating elements 134, 138 permanently connected by a bridge 142. The two isolating elements 134, 138 may have a general shape of a cube, a cuboid, or a rectangular prism with rectangular projections 146 along a top side and rectangular recesses 150 separating the projections 146. The recesses 150 in isolating elements 134 and 138, which are defined by the projections 146, provide for side energy dissipation. Two contact surfaces having gaps allows for contact security and energy dissipation from the side(s) of the isolating elements 134, 138 having the gaps. In some embodiments, the isolating elements 134, 138 may have a cross-sectional shape that is constant throughout.

While the isolating elements 134, 138 are described and illustrated as being the same, the isolating elements 134, 138 may be different from each other, but may be similar to other isolating elements described herein. For example, the differing isolating element may be similar to isolating elements 54, 62, 74, and 106. The differing isolating element may be a cube, a cuboid, or a rectangular prism, having 8 corners and 6 faces. In some embodiments, the differing isolating element may have a square or rectangular cross-sectional shape.

The bridge 142 may be similar to the bridges 58, 66, 78, and 110. The bridge 142 may be a rectangular parallelepiped, a rectangular prism, cuboid, cylindrical rod, or other-shaped bridge that permanently connects the isolating elements 134, 138. In some embodiments, the bridge 142 may include a square, a rectangle, a circular, or an elliptical cross-section. In other embodiments, the bridge 142 may have any type of cross-sectional shape, to include, for example only, triangular, pentagon, hexagon, heptagon, octagon, etc. The bridge 142 may connect to a center of an inner face 154 of the isolating element 138 and to a center of an inner face 158 of the isolating element 134.

The isolating elements 134, 138 and bridge 142 may be formed of the same material and may be a single, monolithic, element or piece. For example, the isolating elements 134, 138 and bridge 142 may be formed of an elastic material, such as a rubber or another elastomer. The isolator 50d may be formed from a single piece of elastic material. For example, the isolator 50d may be injection molded, compression molded, transfer molded, cut from a solid piece of material, extruded, solid-state forming, solution processing, dispersion processing, or formed using any other process for elastomers.

In use, the release of torque by the electric motor 10 results in a compression and deformation of the isolating elements 134, 138. Instead of a point or line contact as in the examples of FIGS. 2A and 2B, the isolating elements 134, 138 provide an improved surface contact, resulting in reduction or elimination of wobbling. In this way, it is possible to damp the vibrations of the electric motor 10 to reduce noise and vibrations in the vehicle compartment.

Now referring to FIGS. 7A and 7B, an example isolator 50e is illustrated. The isolator 50e may have a dumbbell-like shape with two isolating elements 162, 166 permanently connected by a bridge 170. The two isolating elements 162, 166 may have a general shape of a cube, a cuboid, or a rectangular prism with cube, cuboid, or rectangular prism projections 174 along a top side and rectangular recesses 178 separating the projections 174. The multiple small contact areas in isolating elements 162, 166 which are defined by the projections 174 provide extensive side energy dissipation. Two contact surfaces having gaps, as with isolating elements 162, 166, allows for contact security and energy dissipation from the side of the isolating elements 162, 166 having the gaps. In some embodiments, the isolating elements 162, 166 may have a cross-sectional shape that is not constant throughout.

While the isolating elements 162, 166 are described and illustrated as being the same, the isolating elements 162, 166 may be different from each other, but may be similar to other isolating elements described herein. For example, the differing isolating element may be similar to isolating elements 54, 62, 74, 106, and 138. The differing isolating element may be a cube, a cuboid, or a rectangular prism, having 8 corners and 6 faces. In some embodiments, the differing isolating element may have a square or rectangular cross-sectional shape The bridge 170 may be similar to the bridges 58, 66, 78, 110, and 142. The bridge 170 may be a rectangular parallelepiped, a rectangular prism, cuboid, cylindrical rod, or other-shaped bridge that permanently connects the isolating elements 162, 166. In some embodiments, the bridge 170 may include a square, a rectangle, a circular, or an elliptical cross-section. In other embodiments, the bridge 170 may have any type of cross-sectional shape, to include, for example only, triangular, pentagon, hexagon, heptagon, octagon, etc. The bridge 170 may connect to a center of an inner face 182 of the isolating element 166 and to a center of an inner face 186 of the isolating element 162.

The isolating elements 162, 166 and bridge 170 may be formed of the same material and may be a single, monolithic, element or piece. For example, the isolating elements 162, 166 and bridge 170 may be formed of an elastic material, such as a rubber or another elastomer. The isolator 50e may be formed from a single piece of elastic material. For example, the isolator 50e may be injection molded, compression molded, transfer molded, cut from a solid piece of material, extruded, solid-state forming, solution processing, dispersion processing, or formed using any other process for elastomers.

In use, the release of torque by the electric motor 10 results in a compression and deformation of the isolating elements 162, 166. Instead of a point or line contact as in the examples of FIGS. 2A and 2B, the isolating elements 162, 166 provide an improved surface contact, resulting in reduction or elimination of wobbling. In this way, it is possible to damp the vibrations of the electric motor 10 to reduce noise and vibrations in the vehicle compartment.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A motor for driving a fan in a heating and/or cooling system, the motor comprising:
a motor body;
a motor cover; and
an isolator for damping vibrations passed from the motor body to the motor cover,
wherein the isolator includes two isolating elements connected by a bridge, a cross-sectional shape of a first of the two isolating elements being a mirror image of a cross-sectional shape of a second of the two isolating elements, each of the two isolating elements including at least two corners spaced from the bridge in a cross-sectional view, and one of the at least two corners on the first of the two isolating elements being separated from one of the at least two corners on the second of the two isolating elements by a bracket supporting the motor body within the motor cover, and
wherein at least one of the two isolating elements is an X-shaped prism, a cross-shaped prism, a cube on a lower half and a prism having rounded corners and a rounded recess separating the rounded corners on an upper half, a cuboid on a lower half and a prism having rounded corners and a rounded recess separating the rounded corners on an upper half, or a rectangular prism on a lower half and a prism having rounded corners and a rounded recess separating the rounded corners on an upper half.

2. The motor of claim 1, wherein at least one of the two isolating elements is a cube, a cuboid, or a rectangular prism, having eight corners and six faces.

3. The motor of claim 1, wherein at least one of the two isolating elements is the X-shaped prism or the cross-shaped prism.

4. The motor of claim 1, wherein at least one of the two isolating elements is the cube, the cuboid, or the rectangular prism on the lower half and the prism having rounded corners and the rounded recess separating the rounded corners on the upper half.

5. The motor of claim 1, wherein at least one of the two isolating elements is a cube, a cuboid, or a rectangular prism having a plurality of rectangular projections along a top side and a plurality of rectangular recesses separating the plurality of rectangular projections.

6. The motor of claim 5, wherein the at least one of the two isolating elements includes three rectangular projections along the top side.

7. The motor of claim 1, wherein at least one of the two isolating elements is a cube, a cuboid, or a rectangular prism having a plurality of cube, cuboid, or rectangular prism projections along a top side and a plurality of rectangular recesses separating the plurality of projections.

8. The motor of claim 7, wherein the at least one of the two isolating elements includes nine cube, cuboid, or rectangular prism projections along the top side.

9. The motor of claim 1, wherein the bridge connects opposing inside faces of the two isolating elements and has a square, a rectangle, a circular, or an elliptical cross-section.

10. The motor of claim 1, further comprising a flange extending radially from the motor body, the motor cover connecting to the flange and cooperating with the flange to support the motor body, wherein the isolator is arranged horizontally between an outer surface of the motor body and an inner surface of the motor cover or an inner surface of the flange on opposing sides.

11. The motor of claim 10, further comprising at least one bracket having a leg extending orthogonal to the motor body, the at least one bracket including a slot, wherein the bridge is clamped within the slot and supported by the at least one bracket.

12. An isolator configured to for damp vibrations in a motor of a heating and/or cooling system, the isolator comprising:
two isolating elements; and
a bridge connecting opposing inner faces of the two isolating elements, wherein at least one of the two isolating elements including at least two corners in a cross-sectional view, and wherein at least one of the two isolating elements is an X-shaped prism, a cross-shaped prism, a cube on a lower half and a prism having rounded corners and a rounded recess separating the rounded corners on an upper half, a cuboid on a lower half and a prism having rounded corners and a rounded recess separating the rounded corners on an upper half, or a rectangular prism on a lower half and a prism having rounded corners and a rounded recess separating the rounded corners on an upper half.

13. The isolator of claim 12, wherein at least one of the two isolating elements is a cube, a cuboid, or a rectangular prism, having eight corners and six faces.

14. The isolator of claim 12, wherein at least one of the two isolating elements is the X-shaped prism or the cross-shaped prism.

15. The isolator of claim 12, wherein at least one of the two isolating elements is the cube, the cuboid, or the rectangular prism on the lower half and the prism having rounded corners and the rounded recess separating the rounded corners on the upper half.

16. The isolator of claim 12, wherein at least one of the two isolating elements is a cube, a cuboid, or a rectangular prism having at least three rectangular projections along a top side and at least two rectangular recesses, with one rectangular recess separating two of the at least three rectangular projections.

17. The isolator of claim 12, wherein at least one of the two isolating elements is a cube, a cuboid, or a rectangular prism having a plurality of cube, cuboid, or rectangular prism projections along a top side and a plurality of rectangular recesses separating the plurality of projections.

18. The isolator of claim 12, wherein the two isolating elements are the same.

19. The isolator of claim 12, wherein the bridge connects opposing inside faces of the two isolating elements and has a square, a rectangle, a circular, or an elliptical cross-section.

20. A motor for driving a fan in a heating and/or cooling system, the motor comprising:
 a motor body;
 a motor cover; and
 an isolator for damping vibrations passed from the motor body to the motor cover,
 wherein the isolator includes two isolating elements connected by a bridge, a cross-sectional shape of a first of the two isolating elements being a mirror image of a cross-sectional shape of a second of the two isolating elements, and
 wherein at least one of the two isolating elements is an X-shaped prism, a cross-shaped prism, a cube on a lower half and a prism having rounded corners and a rounded recess separating the rounded corners on an upper half, a cuboid on a lower half and a prism having rounded corners and a rounded recess separating the rounded corners on an upper half, or a rectangular prism on a lower half and a prism having rounded corners and a rounded recess separating the rounded corners on an upper half.

\* \* \* \* \*